No. 861,424. PATENTED JULY 30, 1907.
H. BANKS.
CUSHIONING HUB FOR VEHICLES.
APPLICATION FILED OCT. 13, 1906.
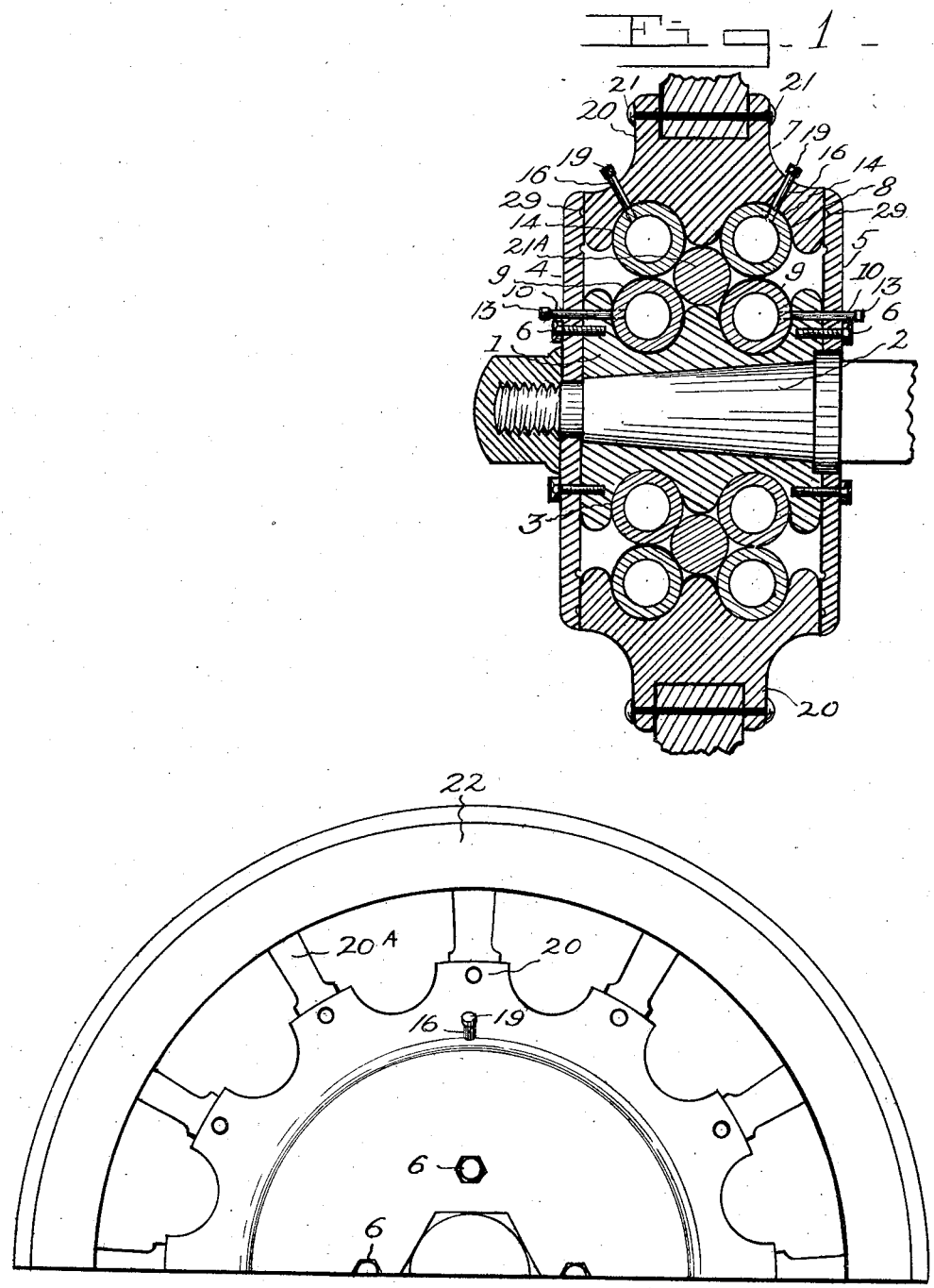

UNITED STATES PATENT OFFICE.

HENRY BANKS, OF LITTLETON, COLORADO.

CUSHIONING-HUB FOR VEHICLES.

No. 861,424.　　　Specification of Letters Patent.　　　Patented July 30, 1907.

Application filed October 13, 1906. Serial No. 338,852.

*To all whom it may concern:*

Be it known that I, HENRY BANKS, a citizen of the United States of America, residing at Littleton, county of Arapahoe, and State of Colorado, have invented a new and useful Cushioning-Hub for Vehicles, of which the following is a specification.

My invention relates to improvements in cushioning hubs for automobiles, motor cycles, and other vehicles, and the objects of my invention are: first, to provide a pneumatic cushion hub for vehicle wheels. Second, to provide a pneumatic cushioning hub, having a plurality of independent pneumatic cushions, so arranged that should any one or a part of them lose their air pressure the remainder will still be sufficient to maintain an elastic cushion. And third, to form a simple, inexpensive, practical, and durable pneumatic cushioning hub for automobile and other vehicle wheels. I attain these objects by the mechanism illustrated in the accompanying drawings, in which:

Figure 1, is a sectional elevation of a hub embodying my invention, and adapted for an automobile or other heavy vehicle. And Fig. 2, is a side elevation of a fragment of a wheel embodying my invention.

Similar letters of reference refer to similar parts throughout the several views.

Referring to Fig. 1, of the drawings, the numeral 1, designates the axle sleeve of my improved hub. This sleeve consists of a circular piece of metal or wood or other suitable material, through the center of which a tapering bore is formed that is adapted to receive rotatably an axle 2, of an automobile or a motor cycle or other vehicle, and around its peripheral surface a plurality of circumferential recesses 3, are formed, two being preferably shown in the drawing, although more may be used if desired. These circumferential recesses are placed at a short distance apart, and quite close to the ends of the sleeve. Both ends of this sleeve are squared and finished at right angles to the axis of the axle bore, and to the ends flange disks 4 and 5, are secured, by cap screws 6, which extend through the flanges and are screwed into the ends of the sleeve. These flange disks project beyond the sleeve a short distance, and between their outer ends I fit a cylindrical hub 7, which is slidably mounted between the flanges and free to move towards and from the axle sleeve eccentrically as the load on it changes, as will be fully described hereinafter. In the inner peripheral surface of this cylindrical hub, I form a plurality of circumferential recesses 8, which in number correspond to the number of circumferential recesses in the periphery of the sleeve, two being shown as in the sleeve, and they are positioned in alinement with and to register opposite to said sleeve's recesses. In each of the recesses of the sleeve, I place an endless rubber ring-shaped tube 9, which is made of a size to fit resiliently in the recesses, and each ring-shaped tube is provided with an air inlet nipple 10, which projects from each tube through and slightly beyond apertures formed in the opposite flange disks 4 and 5, to the outer ends of which air inlet valves and caps 13, are operatively secured, to allow the tubes to be filled with air by any suitable air pump under enough pressure to form full firm air cushioning tubes. In the recesses of the cylindrical hub I also place endless ring-shaped tubes 14, which fit snugly in the recesses on their outer peripheral surfaces, and fit with their inner peripheral surfaces against the outer peripheral surfaces of the sleeve's ring tubes. The endless tubes 14, are also provided with projecting nipples 16, which extend through and beyond apertures formed through the periphery of the cylindrical hub close to its side edges, and an air inlet valve and cap 19 are secured to the outer end of each nipple, which are operatively arranged to permit a supply of air under pressure to be forced into the tubes 14, with any suitable air pump; consequently these four ring-shaped tubes are filled with compressed air under pressure enough to from full hard pneumatic cushion tubes, and their resilient contacting pressure against each other and against the outer periphery of the sleeve and the inner periphery of the cylindrical hub holds the cylindrical hub with a very firm strong resilient pressure centrally around and concentric to the axial center of the sleeve. The periphery of the hub is provided with radiating spoke-receiving flanges 20, to which the spokes 20ᴬ, are secured by rivets 21. The spokes radiate from the flanges to any suitable felly 22. If desired, an additional endless ring-shaped resilient member 21ᴬ, may be inserted in the center of the pneumatic tubes between the sleeve and the cylindrical hub, and this member may be either a solid rubber ring or a pneumatic ring, as desired. I preferably illustrate a solid ring in the center, as it assists in the stability of the hub in case of accidental leakage of air from the pneumatic tubes.

In the inner face of the flanges I form slots 29, which extend circumferentially around the inner face of the flange. These slots are adapted to collect any dirt that may work between the flanges and the movable hub, and they also act as oil conveying channels to lubricate the joint between the flanges and the movable hub.

The operation of my pneumatic cushioning hub is as follows: As the wheel rotates under a load, the cylindrical hub moves eccentrically within the flanges of the sleeve, and compresses the pneumatic tubes as the felly rolls along the ground, and resiliently cushions the felly hub and axle, and consequently the load on the axle and hub and felly, as the wheel rotates.

Having described my invention, what I claim as new and desire to secure by Letters Patent, is:

1. In a pneumatic cushioning hub, the combination with the axle, of the sleeve rotatably mounted thereon, flanges detachably secured to the opposite ends of said sleeve, a pair of circumferential recesses in the periphery of said hub, endless ring-shaped air holding tubes seated on said recesses and surrounding said sleeve, a cylindrical hub fitting slidably between said flanges and surrounding said sleeve, and provided with a pair of circumferential recesses in its inner periphery, a pair of rubber air-holding endless tubes resting on top of said sleeve tubes and fitting in said circumferential recesses of said hub, a pair of air inlet nipples extending from said sleeve's tubes through said flanges and provided with air inlet valves at their outer ends, a pair of nipples extending from said hub's air tubes through said hub, provided with air inlet valves, an air pressure in said air tubes adapted to support said cylindrical hub in operative position relative to said sleeve, and means for securing felly-supporting spokes to said hub.

2. In a pneumatic hub, the combination of the sleeve, the flanges secured to the ends of said sleeve, the cylindrical hub surrounding said sleeve and movable radially towards said sleeve, a group of endless air pressure tubes between said sleeve and said hub, an endless rubber cushion in said group of air tubes, between said sleeve and hub, and oil recesses in said flanges.

In testimony whereof I affix my signature in presence of two witnesses.

HENRY BANKS.

Witnesses:
G. SARGENT ELLIOTT,
J. C. MITCHELL.